Sept. 20, 1938.   F. L. O. WADSWORTH   2,130,702
FEEDER AND METHOD OF FEEDING MOLTEN GLASS
Original Filed March 18, 1933   2 Sheets-Sheet 1
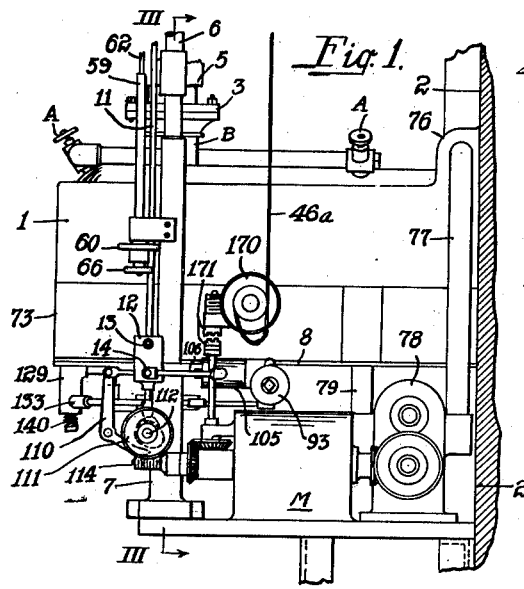
Fig. 1.
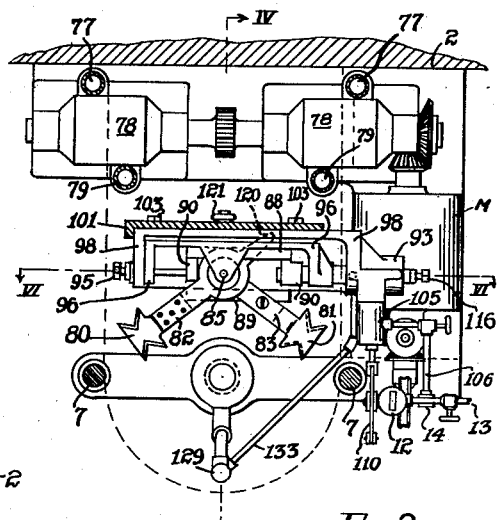
Fig. 2.
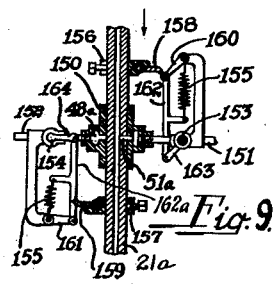
Fig. 9.
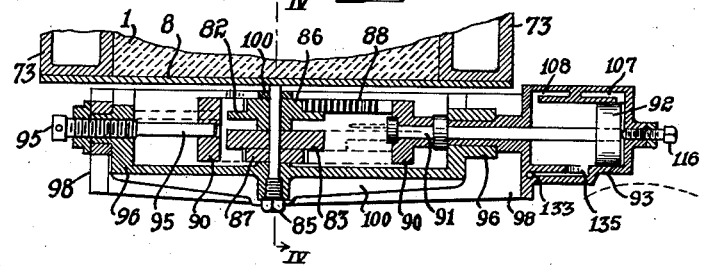
Fig. 6.
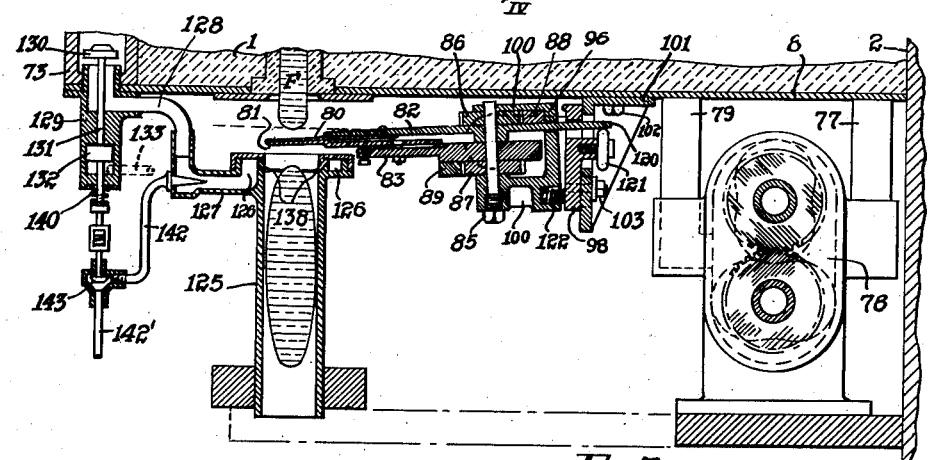
Fig. 7.
Fig. 8.
INVENTOR
Frank L. O. Wadsworth
By Green & McCallister
His Attorneys

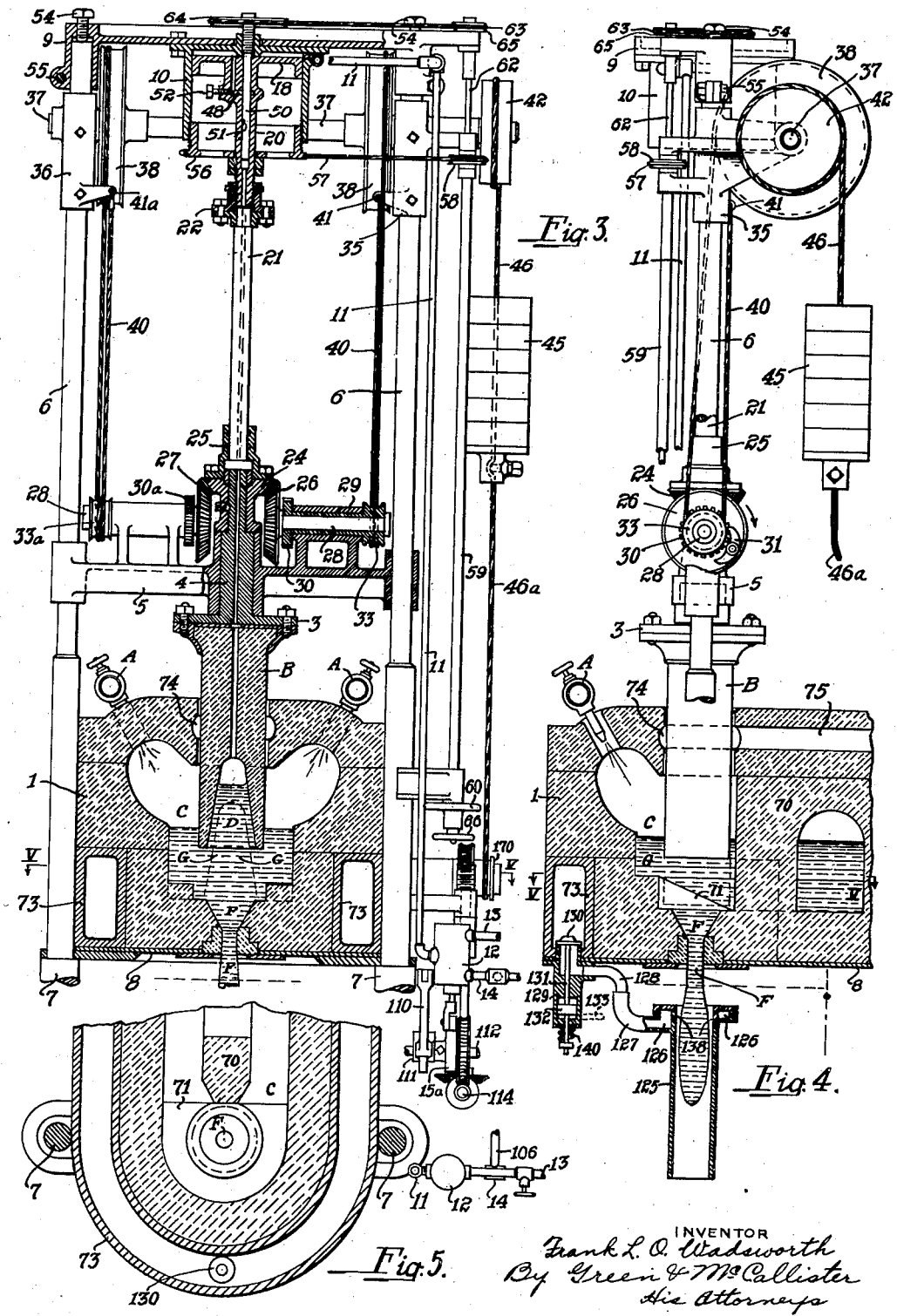

Patented Sept. 20, 1938

2,130,702

UNITED STATES PATENT OFFICE 2,130,702

FEEDER AND METHOD OF FEEDING MOLTEN GLASS

Frank L. O. Wadsworth, Pittsburgh, Pa., assignor to Ball Brothers Company, Muncie, Ind., a corporation of Indiana Application March 18, 1933, Serial No. 661,563
Renewed May 29, 1937

31 Claims. (Cl. 49—55)

My invention relates to continuous flow glass feeders of the hydrodynamic balance type, in which the flow of glass from the delivery or feed orifice is regulated and varied by a progressive increase and decrease in the balanced pressure head of a limited mass of the molten material that is segregated from the parent body or main source of supply by a reciprocable container or "bell", in which there is also confined a fixed predetermined quantity of air or other elastic fluid. The operation of this type of feeder is primarily controlled by the establishment and maintenance of a condition of hydrodynamic equilibrium between the progressive change in the volume, and therefore in the pressure of the trapped mass of elastic fluid, and the resultant flow of molten material into or out of the segregation chamber—this flow being in turn affected or influenced both by the relative areas of the supply and the delivery openings, and also by the temperature and the physical characteristics (e. g., the viscosity) of the glass. In its typical form this hydrodynamic balance feeder also presents the characteristic of not only progressively varying the fluid pressure on the surface of the glass within the segregation chamber, but of also concurrently and cooperatively varying the ratio between the area of the delivery or discharge orifice, through which the glass is extruded or fed, and the area of the inlet or supply passage, through which the glass is admitted from the main supply receptacle to the segregation chamber; and of thus progressively altering the effect of the trapped fluid pressure on the relative flow through these two openings.

The present application is an improvement in the type of feeder disclosed in my copending application Serial No. 653,081, which was filed January 23, 1933; and one of the features of my present improvements relates to the particular manner and means in and by which a predetermined mass of elastic fluid is admitted to, and trapped in, the segregation chamber of the reciprocating bell at a definite point or position in its movement, and is thereafter alternately compressed and expanded—or vice versa—as the movement continues.

Another object of this invention is the provision of an improved form of forehearth or "flow boot" construction which will maintain, or assist in maintaining, a uniform and constant temperature in the parent body of glass that supplies material to the segregation chamber.

A further purpose of these improvements is to provide a form of "double acting" high speed shear, which will separate the flowing stream of glass into a series of mold charges of definite predetermined form and weight without the formation of "shear marks" on the ends of the severed charges.

Still another object of my present invention is the provision of means for accelerating the delivery of each successively severed charge of molten material to the mold or forming receptacle in which it is subsequently pressed or shaped to the desired form.

Other particular and specific purposes and objects of the herein described improvements will be made obvious to those skilled in this art by the accompanying illustrations and description of one embodiment of my invention, in which:

Fig. 1 is a general side elevation of the lower portion of the feeder assembly; Fig. 2 is a general plan view of that part of the assembly which is positioned below the floor of the forehearth or "feed boot"; Fig. 3 is an enlarged front elevation—partly in section on the plane III—III of Fig. 1—of this construction; Fig. 4 is another enlarged side elevation—partly in section on the plane IV—IV of Fig. 2—of a portion of the complete assembly; Fig. 5 is a partial section on the horizontal plane V—V of Figs. 3 and 4; Fig. 6 is a cross section of the shear mechanism on the plane VI—VI of Fig. 2; Fig. 7 is a vertical section through this same mechanism on the plane IV—IV of Figs. 2 and 6; Fig. 8 is a greatly enlarged transverse section through the two shear blades shown in Figs. 2 and 7; and Fig. 9 is a section of a detail illustrating a modification of one part of the organization shown in the other figures.

In the construction illustrated in Figs. 1 to 8 inclusive, I indicates a forehearth which forms an extension of the main glass tank (whose front wall is indicated at 2), and which is provided near its outer end with a submerged, or underflow delivery orifice F of the usual form. A reciprocatory "bell" B, which is provided at its lower end with a frusto-conical segregation chamber D, is positioned above, and in vertical alignment with, the flow opening F, and is extended above the roof of the forehearth I, where it is suitably secured to the lower flanged end 3 of a short shaft 4, that is rotatably mounted in a reciprocable cross head frame 5. The laterally extending arms of this reciprocable member 5 are bored to slide freely up and down on two cylindrical guide rods 6—6, which form a part of the post supports, 7—7, for the sheet metal floor 8 of the forehearth I; and these guide rods are cross connected, at their upper ends, by a vertically adjustable U-shaped head 9, which carries a cylinder 10, that is connected, by the pipe 11 and the timer valve 12, with the fluid pressure conduits 13—14.

The cylinder 10 is provided with a piston 18 that is coupled to the bell supporting shaft 4 by a tubular piston rod 20, and a tubular connecting link 21 which is detachably secured, at its upper end, to the rod 20 by the flanged coupling elements 22. The upper end of the shaft 4 carries a bevel pinion 24, which is keyed or otherwise secured thereto; and the lower end of the link 21 is provided with an enlarged collar which is rotatably engaged by a flanged sleeve 25 that is bolted to the hub of the pinion 24, and thus serves to hold the link 21 in fixed endwise relationship to the shaft 4, while permitting the latter to rotate with respect thereto.

The bevel pinion 24 is engaged on opposite sides with two bevel gears 26 and 27, which are secured to the inner ends of shafts 28—28, that are rotatably mounted in concentric sleeve members 29 (as shown in cross section at the right-hand side of Fig. 3), and these sleeve members are in turn revolvably supported in suitable bearing members on the cross head frame 5. The inner ends of the sleeves 29 carry spur gears 30—30ª, the teeth of which may be engaged by double ended pawls 31 that are pivotally mounted on the adjacent faces of the bevel gears 26 and 27 (as shown in the broken away section in Fig. 4); and the outer ends of these sleeve elements are provided with small capstan pulleys 33—33ª, which are secured to, and rotate with, the said sleeves.

The two vertical guide rods 6—6 also serve to support two L shaped brackets 35—36, which constitute bearing members for a cross shaft 37 that carries a pair of drums 38—38; and each of these drums is connected to the corresponding capstan pulley 33 or 33ª, by means of a wire rope 40, whose ends are attached respectively to the periphery of the drum and to a lug 41 (or 41ª) on the bracket member 35 (or 36). A third drum 42 is secured to one end of the shaft 37 and is connected to a counterweight 45 by means of the rope 46; the mass of this counterweight being preferably so adjusted that it will slightly overbalance the load on the ropes 40—40.

The upper part of the bell B, the shaft 4, and the connecting link 21 are all provided with central passageways, which form a continuous duct that leads from the upper end of the segregation chamber D to the lower end of the tubular piston rod 20; and the upper portion of this tubular rod is provided with a port 48, which leads from its central opening to the upper or rear face of the piston 18. This port connection 48 is momentarily opened, at a predetermined point in the reciprocatory movement of the piston, by a hollow plunger valve 50 which is adjustably mounted in the upper head of the cylinder 10, and which is provided, at an intermediate point in its length, with a small hole 51 in its side wall.

The operation of the parts thus far described is as follows: The conduits 13 and 14 are connected respectively to a suitable source of sub-atmospheric (vacuum) and super-atmospheric fluid pressure; and when the timer valve 12 establishes communication between the conduit 14 and the pipe connection 11, the piston 18—which is then at the upper limit of its stroke—is moved downwardly at a speed dependent upon the actuating pressure and the unbalanced mass of the counterweight 45. The resultant downward movement of the bell toward the orifice F tends to compress the mass of air which is at that time trapped and confined in the upper portion of the segregation chamber D and correspondingly depresses the level of the glass therein. In the first stage of this movement a portion of the glass within the bell B (i. e., in the chamber D) will be forced back into the parent body of molten material in the forehearth chamber (C); but another portion will be forced out through the delivery orifice (F) and thus accelerate, or rather augment, the natural gravity flow therefrom. As the movement continues the area of the passageway G, between the segregation chamber D and the forehearth chamber C, will be continually diminished and the percentage of forced flow from the delivery orifice (F) will, therefore, continually increase. When the port 48 comes into registry with the opening 51, a direct communication between the chamber D and the cylinder-piston chamber (10—18) will be momentarily established; and this will permit the flow of a certain additional amount of compressed fluid to the segregation chamber; this amount being determined and regulated in part by the working pressure in the line 14 and in part (if desired) by the adjustment of a needle valve (52) in the passageway 48. The predetermined mass of air thus admitted to the chamber D—at this predetermined point in the movement of the bell B—is immediately trapped and confined therein by the further downward movement of the piston (which carries the openings 48—51 out of registry with each other); and this fixed mass of elastic fluid is then further compressed—as the movement continues—and produces its maximum effect in accelerating the discharge of glass from the delivery orifice F at the end of the downward stroke.

The timer valve 12 is preferably so adjusted and so actuated that the supply of compressed air, to the cylinder 10, is cut off before the piston 18 has reached the lower limit of its movement, and then, after this movement is completed by the expansion of the air in the piston chamber, and the desired amount of glass has been expelled by the action of the trapped elastic fluid in the chamber D, the timer valve operates to establish communication between the rear end of the cylinder and the vacuum conduit 13; and the exhaustion of air from the piston chamber will cause the piston to rise under the superior pressure of the atmosphere on its lower exposed face. The resultant upward movement of the bell B will reduce or relieve the pressure of the trapped fluid on the surface of the glass therein, and correspondingly reduce the outflow of glass from the delivey orifice. But the lifting of the bell also immediately increases the area of the supply passage G and permits a fresh supply of glass to flow into the segregation chamber and pass out through the delivery opening; and if these concurrent and cooperative actions are properly correlated and controlled there will be no cessation of the outflow or feed of the molten material, but only a temporary retardation, or natural "necking" of the outflowing stream. As the upward movement continues the port 48 will be once more brought into registry with the valve opening 51—at the same predetermined point in the piston-bell movement as before—and another fixed and definte mass of air (at sub-atmospheric pressure) will again be trapped in the upper part of the segregation chamber as the port 48 passes up out of registry with the hole 51. The continuation of the upward movement tends to further expand this already rarefied mass of elastic fluid and thus lift the level of the glass in the chamber D still higher; but the necessary inflow of material to the interior of the bell has now no substantial influence on the gravity flow from the orifice F because of the large area of the constantly expanding passage G. When the connected bell-piston members have reached the upper end of their stroke—as shown in Figs. 3 and 4—the first described operation is repeated.

As already stated the speed of movement during the upward and the downward strokes of the bell-piston assembly may be regulated and controlled by the pressures maintained in the fluid conduit connections 14 and 13, and by the adjustment of the weights in the counterpoise member 45. In order to provide for regulating the length of the stroke, and for also changing the upper and lower limits thereof, I mount the cylinder frame 9 so that it may be adjusted up or down on the guide rod supports 6—6 by means of the screws 54 and the clamp bolts 55; and I also provide a lower open head 56, which is threaded into the cylinder 10, and which can be rotated—for the purpose of moving it up and down with respect to its cylinder support—by means of the belt and pulley connections 57—58, and the tubular shaft and hand wheel members 59—60.

I also provide for adjusting the predetermined point at which the two fixed and definite masses or quantities of elastic fluid are respectively trapped (at super-atmospheric and at subatmospheric pressures) during the downward and upward movements of the bell B. I accomplish this by threading the upper enlarged portion of the plunger valve stem 50 through the head of the cylinder 10 and connecting this threaded member to a shaft 62 by the belt and pulley connections 63—64—65. The shaft 62 is conveniently mounted within the tubular shaft 59, and is provided at its lower end with a hand wheel 66, which —like the wheel 60—is placed within easy reach of the machine operator.

In the operation of any form of glass feeder it is desirable to always maintain the molten material in the forehearth chamber or "feed boot" at a uniform, and as nearly as possible at a constant, temperature. I facilitate the accomplishment of this object by providing a forehearth construction of such form that the total mass or volume of glass contained therein is relatively small as compared with the volume and the internal surface area of the heating chamber above it; and is not large as compared with the average quantity within the bell, or segregation chamber D. The limitation of the mass of molten material in the forehearth is effected—without diminishing the depth of the molten bath—by making the forehearth extension as short as possible, by increasing the thickness of the lower portion of its side walls, and by providing a central partition wall 70 which extends from the tank opening to a point adjacent the rear side of the bell member B (see Figs. 4 and 5). The volume of glass immediately surrounding the bell is further reduced by providing the floor of the forehearth with an upwardly inclined portion 71, which also performs the function of progressively changing the ratio between the reciprocatory movement of the member B and the variation in the area of the supply passage G, when the bell is near the lower end of its stroke, and of thereby controlling and altering the rate of opening and closing this passage independently of the speed of the said movement.

The limitation of the quantity of glass in the forehearth chamber to an amount that is not greatly in excess of the rate of outflow from the delivery orifice F, ensures a fairly rapid movement of the molten material from the main tank chamber (where the mass of glass is so large that temporary fluctuations in the temperature of the heating chamber have no sensible effect on this large mass) to the segregation chamber D; and therefore ensures a relatively frequent replenishment and complete renewal of the entire body of glass from which successive charges are drawn into the bell and discharged therefrom. But this effect may be still further aided, if desired, by imparting either an intermittent, or a substantially continuous rotation to the reciprocating member B—either in the same, or in alternately reversed directions—by the action of the cooperative elements 24—26—27—30—31—33—40. If the rope 40 on the right hand side of Fig. 3 is wrapped around the drum 33 in a clockwise direction, and if the pawl 31 on that side is turned to the position shown in Fig. 4, each upward movement of the cross head frame 5 will revolve the connected elements 33—29—30 in a clockwise direction; and the engagement of the pawl 31 with the teeth of the wheel 30 will revolve the gear 26 in the same direction. This movement will, in turn, also revolve the gear 24, and the shaft-bell assembly 4—B, in a counter-clockwise direction, as viewed from above. On the downward movement of the bell the elements 33—29—30 will be revolved in the opposite (counter-clockwise) direction, but in this movement the teeth of the wheel 30 will ride under the end of the pawl 31 and no movement will be imparted to the gears 26—24, unless the pawl is thrown over to its reverse position. If this is done the gear elements 26—24 will be revolved in a clockwise direction on the down stroke of the bell B.

If it is desired to revolve the bell in the same direction on both the up and down strokes the rope 40 on the left hand side of the assembly is wrapped around the drum 33ª in the same direction as on the opposite side (see Fig. 4). Under these circumstances the elements 33ª—29—30ª will be revolved in a clockwise direction (as viewed from the left) when the cross head frame is moved downward; and if the pawl on the gear 27 is so turned that it engages with the teeth on the wheel 30ª in this direction of movement the gear 24 and the bell assembly B—4 will be correspondingly revolved in a counter-clockwise direction; i. e., in the same direction as it was revolved by the elements 33—29—30—31 and 26 on the upward movement of the cross head frame. If the pawl on the gear 27 is reversed in position then the bell will be revolved in a clockwise direction on the upward movement.

If it is desired to oscillate the bell back and forth through a fixed arc this can be done by reversing the direction of the winding of the rope 40 on the drum 33ª (as shown in Fig. 3), and setting the pawls 31, so that the gear 26 is revolved in one direction when the cross head 5 is moving downwardly, and the gear 27 is revolved in the same direction on the upward movement. In this case each pawl will of course always remain in engagement with the same tooth on its cooperating wheel; the action being the same as that which would occur if both of the gears 26—27 were locked to the cooperating spur gear 30 and 30ª.

I am thus enabled by this arrangement to revolve the bell always in one direction; either clockwise or counter-clockwise, on each downward movement alone, or on each upward movement alone, or on both the downward and upward movements; or to oscillate it back and forth through a fixed arc (whose magnitude varies with the range of movement and with the relative diameters of the elements 33—33ᵃ—24—26—27) on each downward and upward movement. I can thus continuously accelerate or retard the natural flow of glass through either of the channels on the two sides of the central partition wall 70, or alternately accelerate and retard this flow in both channels, as conditions may require.

In the construction shown in Figs. 1, 3 and 4, I have also made provision for retarding the escape of heat from the outer surface of that portion of the forehearth wall which is in contact with the molten material. I do this by surrounding this part of the forehearth by a hollow U-shaped box casting 73 which is best made of a high chromium nickel steel alloy, or "Fahrite", which has a relatively low heat conductivity, and which is not deleteriously affected by temperatures of 2000 degrees F. The exposed side and bottom surfaces of this box should be covered by a white asbestos paint or enamel—or with thin sheets of similar material suitably cemented thereon—to minimize radiation losses; and the interior of the box may be highly heated by suitable electric resistance elements or in any other well known way. I prefer however to keep the box at a high temperature by forcing into it a portion of the excess gases of combustion which fill the enlarged upper portion of the forehearth chamber; and which tend to escape therefrom through the opening around the upper part of the bell B. In order to do this I provide the arched roof blocks which surround this opening with an annular recess 74, which communicates with a flue 75 that leads rearwardly to a small dome 76, that adjoins the front wall 2 of the main tank chamber. Heavy pipes 77, of high thermal resistivity (e. g., Fahrite) lead from this dome to some simple form of rotary pump 78 (e. g., the twin drum Root blower shown in Figs. 1—2), which is positioned beneath the forehearth, and is driven by a suitable variable speed motor M. The casing and rotor elements of this pump are preferably made of high chromium nickel steel, and the shafts and bearing members are suitably water cooled to prevent excessive heating of these parts. The delivery nozzles of the pump are connected directly to the rear ends of the U-shaped box 73, by the short vertical pipes 79—79; and the rotor members are revolved at such speed as to maintain a relatively low pressure of two or three pounds (gage pressure) in the said box.

My improved feeder assembly also comprises a "high-speed" shear mechanism, for severing the flowing stream of glass into a series of successive mold charges, of definite form and weight, without scarring or chilling the molten material at the plane of severance. The general construction and arrangement of the main elements of this mechanism are best shown in the plan view of Fig. 2, and are illustrated in greater detail in the enlarged sectional views of Figs. 6, 7 and 8. This construction comprises a pair of double ended, or double acting, shear blades 80—81, which are adjustably secured to the ends of the arms 82—83, that are rotatably mounted, one above the other, on a vertical stud pin 85. These arms are respectively provided with the spur pinions 86—87, which are engaged, on opposite sides, by the toothed racks 88—89, that form the side bars of a reciprocable box shaped member 90. The inner (right hand) end of this member is pivotally connected to the outer extremity of a piston rod 91, which is attached to a piston 92 in the cylinder 93; and the opposite (left hand) end is slidably engaged with a guide bar 95, that is adjustably mounted in the adjacent portion of a frame 96, which is pivotally supported, at both ends, on the U-shaped head 98 of the cylinder 93, and which is provided near its center, with bracket supports 100—100, for the stud pin 85. This entire assemblage of parts, 80 to 100 inclusive, is supported, as a unit, on the angle bracket 101, which is bolted to the floor plate 8 of the forehearth (see Figs. 2 and 7); and the joint adjustment of this bracket, and of the head 98 with respect thereto—which can be effected by slotting the holes through which the clamp bolts 102 and 103 are passed—makes it possible to bring the path, and the plane of movement, of the shear blades 80—81 into any desired relationship to the flow orifice F.

The cylinder 93 is provided at one side with a timer valve member 105, which is connected to the pressure conduit 14, by a pipe 106, and to the opposite ends of the cylinder 93 by the passages 107 and 108. The piston, or plunger rod, of this timer valve is actuated by a bell crank lever 110, and a cam 111 which is mounted on the cam shaft 112 and is driven by a worm and worm wheel connection with the shaft 114 of the motor M (see Figs. 1 and 3). When it is desired to operate the shear mechanism—to sever the stream of glass flowing from the delivery orifice F—the timer valve is moved to open communication between the pipe 14—106 and the passage 107, and the admission of compressed fluid to the right hand end of the cylinder 93 forces the piston 92 to the left, and rotates the shear blade elements 80—82—86, and 81—83—87, in opposite direction, about the axis of the stud pin 85. The shear blades 80—81 meet and cross each other at the central point of the piston stroke—where the speed of movement is at or near its maximum—and continue on until the blade 80 has reached the position initially occupied by the blade 81, and vice versa;—the length of the piston stroke and the limits of its movement being controlled by the joint adjustment of the shouldered guide rod 95 and the set screw 116. In order to slow down the last half of this movement, and bring the parts to rest without appreciable shock or jar, the timer valve cam 111 is so shaped that the port 107 is closed before the piston reaches the end of its stroke, and the port 108—which is open to the atmosphere during the first half of the movement—may also be partially, or wholly, closed after the shear blades have met and passed each other; and the resultant drop in pressure behind the piston—aided by an accompanying trapping and compression of air in front of the piston—will gradually check and arrest its final movement to the left.

The parts will remain in the position last described until the continued rotation of the timer valve cam 111 again operates the timer valve to establish communication between the pressure supply lines 14—106 and the port 108 (the opposite port 107 being now open to the atmosphere), and thus move the piston 92, and the parts actuated thereby through a reversed cycle of action which is controlled in the same manner as before. In this reversed or return movement the stream of glass will be severed by the opposite edges of the symmetrically shaped double ended blades 80—81, which are so mounted and adjusted (as best shown in Figs. 7 and 8) that they will act in the same manner for both directions of movement.

It is obvious that the above described form of double acting shear mechanism will operate to sever the stream of glass much more quickly than any form of shear in which the blade or blades are successively closed and opened at each severing operation; and that the danger of marring or marking the glass at the plane of severance, and of heating the cutting edges by continued contact with the molten material, is thus eliminated.

My improved high speed severing device is also provided with means for accelerating the downward movement of the severed charge of glass immediately after it is separated from the oncoming stream, and thus increasing the speed with which this charge is delivered to the receiving receptacle. This desirable result is accomplished by providing one of the shear arms (e. g., the arm 82) with an extension 120, which passes through elongated slots in the members 96—98 and 101, and which is adapted to engage and ride over a roller 121 that is mounted on the frame 98 at a point immediately behind the stud pin 85 (in the plan IV—IV of Figs. 2 and 6). The engagement of the arm 120 with the roller 121 rocks the frame 96 on its trunnion supports in the cylinder head 98, and thus imparts to the transversely moving shear blades 80—81 a rapid downward movement (at the instant of crossing) which is, in turn, communicated to the severed charge of glass (see Fig. 7). This movement also carries the upper surfaces of the cutting elements out of engagement with the lower end of the oncoming stream of glass, and thus assists in further reducing the time of contact between the shear blades and the molten material upon which they act. The short interval during which the frame 96 is rocked to the position shown in Fig. 7 is determined by the width of the extension arm 120; and after this arm has passed over the roller 121 the parts are restored to normal position by the compression spring 122.

I have also provided auxiliary means by which the downward movement of the severed charge of glass may be further accelerated, after the shear blades 80—81 have ceased to act. Various devices may be provided for this purpose; but as here shown the desired result is obtained by providing a removable guard tube 125, whose inner diameter is slightly larger than that of the severed charge and whose upper end is enlarged to form an ejection chamber 126 that is connected to the interior of the U-shaped box 73 by the double elbow pipe joints 127—128, and the valve box 129. The box 129 contains a disc valve 130, which is attached to a stem 131, that is secured, at its lower end to a piston 132; and the space below this piston is connected, by the pipe 133, with a port 135 on the lower side of the cylinder 93 (see Fig. 6). This port is so positioned, and is of such length, that it will be opened to the space behind the advancing piston (in either the left hand or right hand movement of the latter) at the central point in its stroke; and when so opened the compressed fluid in the cylinder 93 will be admitted to the space below the piston 132 and will lift the disc valve 130 from its seat. The opening of the valve 130 will permit the compressed and highly heated gas in the box 73 to rush out, through the connections 127—128, into the ejection head 126, and to be discharged therefrom, through the narrow downwardly inclined annular slot 138, against the upper end portion of the freshly severed charge of glass in the guard tube 126; and the downwardly flowing annular sheet of hot gas performs two functions, i. e., that of further accelerating the falling movement of the mold charge, and that of preventing the surfaces of this charge from coming into contact with, and being chilled by, the surrounding tube 125.

The valve 130 will remain open until the drop in pressure behind the piston 92 will permit the adjusted tension of the spring 140 to overcome the corresponding pressure on the piston 132; and these two effects may be so controlled by the adjusted action of the timer valve 105, and the adjusted force of the spring 140, that the flow of hot gas from the box 73 is cut off as soon as the severed charge has passed out of the tube 125.

In Fig. 7 I have shown a slight modification of the ejection "accelerator" which has just been described. This alternative form of construction differs from that illustrated in Figs. 1, 2 and 4 only in having a supplementary pipe connection 142, which leads from the elbow 127 to a suitable source of gaseous or liquid fuel, and which is provided with a control valve 143 that is flexibly coupled to the lower end of the piston stem 131. When the piston 132 is lifted by the admission of compressed air to the pipe 133 (see supra) the valve elements 130 and 143 are concurrently opened, to permit of a stream of fuel to enter the ejection chamber 126 and be mixed with the flow of fluid from the box 73. When this supplementary device is used the inlet pipes 77 of the pump 78 are disconnected from the flue connections 75—76, and are opened to the atmosphere, and the pump is then used to keep the box 73 charged with air under a pressure which is slightly less than that maintained in the fuel supply connection 142. The air thus pumped into the box 73 will become highly heated by radiation and conduction from the adjacent walls of the forehearth, and will in turn serve as an insulating envelope for those walls; and when the valve 130 is opened to admit this heated air to the chamber 126, the mixture of air and fuel therein will be projected from the annular slot 138, and will be immediately ignited by the hot glass to form a downwardly moving sheet of flame which will perform the same functions and accomplish the same results that are secured by the use of the superheated gas discharge from the box 73.

The cam 15ª which operates the timer valve 12—to control the up and down movements of the bell B—is preferably mounted on the same shaft (112) that carries the shear actuating timer valve cam 111; and it will be understood that these two cams may be manually adjusted to act in any desired phase relationship, and thus effect the severing and delivery of successive mold charges at any desired point or points in the reciprocating movement of the bell member. It will also be understood that if it is desired to cut off only one charge in each complete cycle of this reciprocating movement, these two cams will be so shaped as to operate in a two to one ratio—i. e., the cam 111 acts to produce only one half cycle movement of the piston 92 (to the right or left) while the other cam is acting to produce a full cycle movement (up and down) of the piston 18.

In Fig. 9 I have illustrated another means for alternately connecting the segregation chamber D with two independent sources of fluid pressure during the reverse reciprocatory movements of the piston bell assembly 18—B. In this alternative construction the port 48, in the piston 18, is closed (e. g., by the needle valve 52); and the tubular link 21 (here indicated as 21ª) is provided, at an intermediate point in its length, with a lateral port opening 51ª, which is adapted to register, at a particular point in its reciprocatory movement, with a narrow annular slot 48ª, that is formed in a stationary sleeve 150. This slot is connected, on opposite sides of the sleeve, with two conduits, 151 and 152, which lead respectively to two independent reservoirs, or other suitable sources of different fluid pressures; and each of these conduits is provided with a control valve (153 and 154), which is normally held open by a spring (155). The link 21ª carries two collars 156 and 157, which are each provided with a pivoted "one way" dog or pawl element (158 or 159), that is adapted to cooperate with the offset member (160 or 161); of a "parallel link" system (160—162—163, or 161—162ª—164), in such manner that when the link 21ª is moving downwardly (as indicated by the arrow in Fig. 9), the dog 158 on the collar 156 will engage the arm 160 and will close the valve 153 before the ports 48ª and 51ª come into registry; and when the link is moving upwardly the dog 159 (which in the completion of the downward movement has been carried under the arm 161) will engage the member 161 and close the valve 154 before the said ports are again brought into registry. This mechanism therefore acts—like the one previously described—to momentarily connect the segregation chamber D with a source of higher pressure (e. g., super-atmospheric), at a definite point in the downward movement of the bell, and to also momentarily connect this chamber to a source of lower pressure (e. g., preferably sub-atmospheric) at the same point in the upward movement. This point of connection may be adjusted by moving the entire sleeve-valve-lever-control system, (which may be supported as a unit assemblage on one of the guide rods 6), up or down on its support; and correspondingly adjusting the collars 156 and 157 on the tubular link 21ª.

When it is desired to lift the bell B entirely out of the forehearth, the link 21 (or 21ª) is disconnected from the piston rod 20 and the gear 24, and is removed; and the cross head frame 5 can then be raised by pulling down on the counterweight 45. In order to expedite this action the platform support for this weight may be connected, by the cord 46ª, with a small winding drum 170, which can be operatively coupled to the motor shaft 114 by any suitable train of mechanism (such as is shown, for example, in Figs. 1, 2 and 3) that can be connected or disconnected at will (e. g., by the jaw clutch elements 171); and other suitable means may be provided for disconnecting the motor shaft either from the pump shaft, or from the timer valve shaft, when it is desired to use the motor for hoisting purposes alone.

When the successively formed and severed masses of glass are to be delivered in regular order, to the molds of a forming (press, or press-and-blow) machine, it is desirable to operate the mold table of the machine in a definite and predetermined synchronism with respect to the feeder mechanism; and this may be accomplished either by connecting the motor shaft 114 to the mold table—if the movement of the latter is continuous—or by the provision of a third timer-valve system, which is actuated by the cam shaft 112, and which controls the start and stop movements of the said table. The provision of means for accelerating the downward delivery of the severed charges of glass facilitates the use of a continuously moving mold table, because it greatly shortens the time during which the mold receptacle must be retained in its receiving position; and this, in turn, cooperates with the continuous flow action of the feeder in increasing the rate of production obtainable with the entire feeder-forming-machine organization.

With the preceding disclosure as a guide, those skilled in this art will be able to devise many other specific forms of apparatus for practicing the procedure hereinbefore described, and for utilizing, in whole or in part, the various features of improvement which characterize my present invention, as defined in the accompanying claims.

I also desire it to be understood that I have designed various other apparatus and procedures for feeding molten glass in a continuously flowing but pulsating stream, and that such apparatus and procedures form the subject matter of and are claimed in copending applications for Letters Patent and structurally and functionally distinguish from the subject matter herein claimed.

What I claim as new and desire to secure by Letters Patent is:

1. The herein described method of forming and delivering charges of molten glass, which comprises the establishment and maintenance of a flowing stream through a delivery orifice and the alternate segregation and expulsion of successive masses of the material above and through the delivery orifice, by the application of fluid pressures that are suddenly varied at the same point in each cycle of segregation and expulsion and are progressively varied during the remaining period of cyclic action.

2. The herein described process of feeding glass which consists in segregating a limited mass of molten material in a segregation chamber above a delivery orifice by trapping a predetermined quantity of low pressure elastic fluid within said chamber and progressively varying the volume of said trapped low pressure fluid, and then expelling the segregated glass through the orifice by trapping a predetermined quantity of high pressure elastic fluid within said chamber and progressively varying the volume of the trapped high pressure fluid.

3. The herein described method of delivering a continuously flowing stream of molten glass from a glass containing receptacle, which comprises the admission of successive masses of the molten material to the interior of a vertically reciprocating hollow implement positioned above the delivery orifice, trapping a predetermined quantity of elastic fluid in the said interior at a definite point in the upward movement of the said implement to establish a predetermined pressure therein, trapping another and greater predetermined quantity of elastic fluid therein at the same point in the downward movement thereof to establish another predetermined pressure therein, and progressively varying the said pressures in the intervals between their establishment.

4. The herein described process of delivering a stream of molten glass from an orifice in the floor of a glass holding receptacle, which comprises the feeding of successive small masses of the molten material from the said receptacle to a segregation chamber adjacent said orifice and the expulsion of the glass therefrom under the action of fluid pressures of lesser and greater magnitudes, respectively, which are momentarily fixed and predetermined at one and the same point in each cycle of segregation and expulsion action and are progressively varied during the remainder of that cycle, and concurrently varying the resistance of the flow of glass from the said receptacle to the said chamber and from said chamber to said receptacle.

5. The method of forming and delivering a charge of molten glass from a supply body through an orifice submerged by such body, which includes the steps of segregating a quota of molten glass from such body and above such flow orifice, moving said quota toward said orifice subjecting the surface of such quota to a predetermined fluid pressure at a definite point in its downward movement, gradually varying such fluid pressure, moving such quota away from said orifice while continuing the application of such pressure, then subjecting the surface of such quota to another and lesser fluid pressure while continuing the upward movement thereof and gradually varying such fluid pressure during the further upward motion of such quota.

6. The method of forming and delivering charges of molten glass through an orifice submerged by a body of such material which consists in segregating a quota of glass from such body and above such orifice, alternately moving the segregated quota away from and toward said orifice, trapping a predetermined quantity of low pressure elastic fluid above said quota at a definite point in its movement away from said orifice, continuing the movement of said quota away from said orifice to progressively vary the volume of the low pressure fluid trapped thereabove, trapping a predetermined quantity of high pressure elastic fluid above said quota at a definite point in its movement toward said orifice and continuing the movement of said quota toward said orifice to progressively vary the volume of the high pressure fluid trapped thereabove.

7. In combination in a feeder for molten glass, a glass receiving receptacle having a flow orifice formed in the bottom thereof, a bell projecting downwardly into said receptacle and aligned with said orifice, pressure responsive means for moving said bell toward and away from said orifice, and means associated with said pressure responsive means for alternately connecting the interior of said bell to superatmospheric and subatmospheric pressures at one predetermined point intermediate the ends of its reciprocatory motion.

8. The herein described process of feeding molten glass which consists, in establishing and maintaining a flowing stream of glass through a submerged orifice, admitting successive small quantities of molten glass to the interior of a hollow reciprocable implement positioned above the orifice, moving said implement toward said orifice, trapping a predetermined quantity of elastic fluid pressure in the interior of said implement at a definite point intermediate of the ends of its downward travel, progressively compressing the trapped fluid on continued downward movement of the implement to exert a pressure on the glass therein and expel the glass therefrom, moving said implement away from the orifice while continuing the application of said pressure, trapping another quantity of elastic fluid of lesser magnitude in the interior of the implement at a point in its upward movement intermediate of the ends thereof, and progressively expanding the trapped fluid on continued upward movement of said implement.

9. The method of forming and delivering a charge of molten glass from a supply body through an orifice submerged by said body, which consists in establishing and maintaining a flow of material through such orifice, segregating a quota of glass in a reciprocating segregation chamber above said orifice, moving said segregation chamber toward the orifice, trapping a predetermined quantity of fluid under superatmospheric pressure in said chamber at a definite point in the downward movement thereof, progressively compressing said trapped fluid while concurrently increasing the resistance of flow from said chamber to said body, moving said segregation chamber away from said orifice to remove the resistance of flow from said body into said chamber, trapping a predetermined quantity of elastic fluid under subatmospheric pressure in said chamber after the resistance to flow from such body into said chamber has been removed, and expanding said trapped fluid on the continued upward movement of said chamber.

10. The method of forming and delivering successive charges of molten glass from a parent body through an orifice submerged by said body which consists, in alternately moving a segregation chamber toward and away from said orifice, trapping one predetermined quantity of elastic fluid in said chamber at a definite point during the downward movement of said chamber, and another and lesser predetermined quantity of such fluid therein at the same point in its upward movement and progressively compressing and expanding the trapped fluid by the continued downward and upward movement of said chamber, respectively.

11. The method of feeding molten glass from a container having a submerged orifice and a hollow reciprocating implement above said orifice which consists in alternately connecting the interior of the implement to superatmospheric and subatmospheric pressures at the same point intermediate the ends of the downward and upward movements thereof, and progressively compressing and expanding the superatmospheric and subatmospheric pressures, respectively, to expel the glass from and occasion a flow to the interior of the implement.

12. The method of feeding molten glass from a container having a submerged orifice and a hollow reciprocating implement above the orifice which consists in segregating a quota of glass in the interior of said implement on the upward stroke thereof by trapping a quantity of elastic fluid under subatmospheric pressure therein at a definite point intermediate the ends of such stroke, expanding such trapped fluid on continued upward movement thereof to fill the interior of the implement, expelling the glass from said implement on the downward movement thereof by trapping a predetermined quantity of elastic fluid therein under superatmospheric pressure at the same definite point in its downward stroke, progressively compressing the trapped fluid while increasing the resistance of flow from the interior of the implement to the container and continuing the application of such expelling force for a predetermined interval after the start of the upward stroke.

13. The method of feeding molten glass from a container having a submerged orifice and a reciprocating implement positioned above said orifice which consists, in establishing and maintaining a flowing stream through said orifice, segregating a quota of glass in the interior of the said implement, applying a fluid pressure of predetermined value to expel the glass from said implement, progressively varying said fluid pressure while progressively increasing the resistance of flow from said implement to the body of glass in said container and in continuing the application of such fluid pressure for a predetermined interval while progressively decreasing the resistance of flow from the body of glass to said implement for preventing any retardation and arresting of the stream flowing through the orifice.

14. An improvement in the art of feeding glass from a glass containing receptacle which comprises, the steps of admitting successive small quantities of the molten material to the interior of a hollow reciprocating implement positioned above a submerged discharge orifice, accelerating the natural gravity flow through the orifice by subjecting the surface of the glass within said implement to an elastic fluid pressure which has a fixed and predetermined value at one definite point intermediate the ends of its travel in the downward movement thereof, and which is progressively varied at all other points in the said downward movement, in continuing the effect of said pressure at the start of the upward movement of said implement, and then at a definite point intermediate of the ends of its travel in the upward movement thereof subjecting the surface of the glass to another fluid pressure of fixed and predetermined value but of lesser magnitude which is progressively varied by the further upward movement thereof.

15. The art of feeding molten glass through an orifice submerged by a body of such material which consists in reciprocating a hollow implement above said orifice to alternately restrict and permit free passage of the material through the orifice, utilizing the upper portion of the reciprocatory motion of said implement as a segregation stroke and the lower portion of said movement as an expulsion stroke and trapping predetermined quantities of fluid pressure of lesser and greater magnitudes, respectively, within said implement at the beginning of each of said segregation and expulsion strokes, and progressively varying the pressure within said implement during the remainder of said expulsion and segregation strokes.

16. The art of feeding molten glass through an orifice submerged by such material which consists in reciprocating a hollow implement above and in line with said orifice to alternately restrict and permit the flow of material from the parent body through the orifice, utilizing the upper portion of the stroke of said implement for the purpose of segregating the material within said implement, utilizing the lower portion of said reciprocatory motion for expelling the material therein through the orifice, trapping a predetermined quantity of elastic fluid within said implement at the beginning of the segregation stroke, progressively expanding said fluid until said reciprocatory implement reaches the upper end of its travel, progressively compressing said fluid during the remainder of the segregation stroke, trapping another and greater predetermined quantity of elastic fluid in said implement at the beginning of the expulsion stroke, progressively compressing said fluid until said implement has reached the lower limit of its travel and then progressively expanding said fluid during the remainder of the expulsion stroke of said implement.

17. The herein described process of feeding glass which comprises the steps of segregating a limited mass of molten material in a segregation chamber above a delivery orifice and then expelling the material from such chamber at an increasing rate of flow by alternately trapping predetermined quantities of elastic fluid under subatmospheric and superatmospheric pressure respectively within said chamber and thereafter alternately expanding and compressing such trapped quantities of elastic fluid to progressively vary the pressures thereof.

18. The method of forming and delivering a charge of molten glass from a body of molten glass through an orifice submerged by said body which includes segregating a quota of glass from such body and above such orifice, moving a portion of the segregated quota of glass away from and toward such orifice, subjecting the surface of such segregated quota to a predetermined subatmospheric pressure at a predetermined point in the movement thereof away from the orifice, subjecting the surface of such quota to a predetermined superatmospheric pressure at a predetermined point in the movement thereof toward the orifice and progressively varying each of said pressures while continuing the movement of such quota away from and toward the orifice.

19. A glass feeder comprising a glass container having a submerged delivery outlet therein, an air bell reciprocating in said container, means connected to said bell for reciprocating the same and an overrunning drive responsive to the reciprocatory movement of said bell for imparting rotary movement thereto.

20. A glass feeder comprising a glass container having a submerged delivery outlet therein, an air bell reciprocating in said container, means for reciprocating said air bell and means for rotating said bell including a driven mechanism and a pawl and gear connection between said bell and said driven mechanism.

21. A glass feeder comprising a glass container having a submerged delivery outlet therein, an air bell reciprocating in said container, means for reciprocating said air bell and means for rotating said bell including an overrunning device associated with said bell, and means responsive to the reciprocation of said bell for driving said overrunning device.

22. A glass feeder comprising a glass container having a submerged delivery outlet therein, an air bell reciprocating in said container, means for reciprocating said air bell and means for rotating said bell including a shaft, means responsive to the reciprocation of said bell for driving said shaft and an overrunning device between said shaft and said bell.

23. A glass feeder comprising a glass container having a submerged delivery outlet therein, an air bell reciprocating in said container, means for reciprocating said air bell and means for rotating said bell including a shaft driven by the reciprocatory movement of said bell and an overrunning connection between said bell and said shaft.

24. Glass feeder apparatus comprising a glass container having a submerged discharge outlet, an air bell reciprocating in said container, a piston connected to reciprocate with said air bell and having a passageway communicating with the interior of said bell, a cylinder in which said piston reciprocates, means for connecting said cylinder alternately to sources of subatmospheric and super-atmospheric pressures, and a tubular member carried by said cylinder and projecting into the passageway in said piston, said tubular member having a port in the wall thereof adapted to be momentarily uncovered on reciprocation of said piston and pneumatically connect said cylinder with the interior of said bell.

25. Glass feeder apparatus comprising a glass container having a submerged discharge outlet, an air bell reciprocating in the container, a piston connected to reciprocate with said air bell and having a passageway therein communicating with the interior of said bell, a cylinder in which said piston reciprocates and a ported tubular member projecting into and normally closing the passageway in said piston, and means for varying the position of said tubular member.

26. Glass feeder apparatus comprising a glass container having a submerged discharge outlet, an air bell reciprocating in the container, a piston connected to reciprocate with said air bell and having a passageway therein communicating with the interior of said bell, an open-ended cylinder in which said piston reciprocates, means for alternately connecting the closed end of said cylinder to sources of super and sub-atmospheric pressures, a tubular member carried by said cylinder and adapted to close the passageway in said piston, said tubular member having a port therein adapted to be uncovered on the reciprocatory movement of said piston and momentarily connect the interior of said cylinder to the interior of said bell whereby quantities of super and sub-atmospheric pressures are trapped in said bell.

27. Glass feeder apparatus comprising a glass container having a submerged delivery outlet therein, an air bell reciprocating in said container, a piston connected to reciprocate with said air bell, an open-ended cylinder in which said piston reciprocates, means for alternately connecting the closed end of said cylinder to sources of elastic fluid under super and sub-atmospheric pressures, and means responsive to the movement of the piston in said cylinder for momentarily connecting the interior of the cylinder to the interior of said bell whereby quantities of such elastic fluids are trapped in said bell on movement thereof in each direction.

28. A method of feeding molten glass in a suspended stream through an orifice submerged by a pool of such material which consists in establishing an unrestrained gravity flow from the pool through the orifice while subjecting the surface of the material over the orifice to vacuum to accumulate a quota of glass above the orifice, restricting the flow from said pool to the orifice, subjecting the surface of the accumulated quota to pressure while the flow is restricted and then removing the restriction between the pool and the orifice while subjecting the surface of the material at the orifice to a progressively decreasing pressure to prevent the flow through the orifice from being retarded.

29. A method of feeding molten glass from a parent body through a submerged orifice which consists in establishing a gravity flow of material from the parent body through the orifice, subjecting the surface of the glass above the orifice to sub-atmospheric pressure to accumulate a quota of material thereabove while maintaining the gravity flow therethrough, subjecting the surface of the accumulated quota to super-atmospheric pressure to expel such quota through the orifice while closing communication between the parent body and the orifice, and then reestablishing communication between the parent body and the orifice while maintaining the glass at the orifice under a progressively decreasing expelling force.

30. A method of feeding molten glass in a suspended stream through an orifice submerged by a pool of such material which consists in establishing a gravity flow from the pool through the orifice, raising the level of the material over the orifice to a height above the level of the pool to accumulate a quota of material above the orifice while maintaining such gravity flow therethrough, periodically restricting the flow from the pool through the orifice to segregate such quota from said pool, and discharging such segregated quota through the orifice during the period of restricted flow.

31. A method of feeding molten glass in a suspended stream through an orifice submerged by a pool of such material which consists in segregating a quota of glass from said pool and above said orifice, moving the quota toward said orifice, subjecting the quota to a predetermined quantity of high pressure fluid while such quota is moving toward said orifice, continuing the movement of said quota toward said orifice to vary the quantity of high pressure fluid, moving said quota away from said orifice while continuing the application of said high pressure fluid to said quota, subjecting the quota to a predetermined quantity of low pressure fluid while said quota is moving away from said orifice and continuing the movement of said quota away from said orifice to vary the quantity of said low pressure fluid.

FRANK L. O. WADSWORTH.